Figure 1:
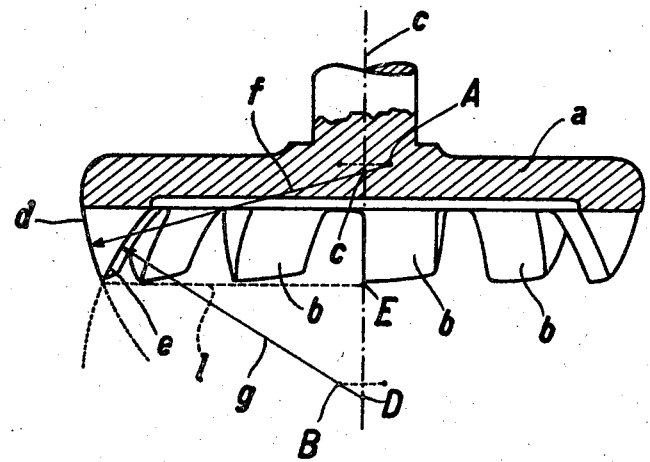

April 19, 1938.   W. BAUERSFELD   2,114,793
CURVED TOOTH FOR BEVEL GEAR WHEELS
Filed Feb. 26, 1937    2 Sheets-Sheet 1

Inventor:
Walther Bauersfeld.

April 19, 1938.    W. BAUERSFELD    2,114,793
CURVED TOOTH FOR BEVEL GEAR WHEELS
Filed Feb. 26, 1937    2 Sheets-Sheet 2

Inventor:
Walther Bauersfeld.

Patented Apr. 19, 1938

2,114,793

UNITED STATES PATENT OFFICE 2,114,793

CURVED TOOTH FOR BEVEL GEAR WHEELS

Walther Bauersfeld, Jena, Germany, assignor to the firm of Carl Zeiss, Jena, Germany Application February 26, 1937, Serial No. 127,896
In Germany March 2, 1936

1 Claim.  (Cl. 74—459.5)

Application has been filed in Germany, March 2, 1936.

It has been suggested repeatedly to obtain the known advantages of double helical spur wheels by providing spur gear and bevel gear wheels with teeth in the form of arcs of a circle. The suggestion has been to the effect of making the tooth flanks of such wheels by means of cutters having teeth with rectilinear cutting edges and effecting a rolling motion. The profile of the flanks of any spur gear wheel of a set of gear wheels is known to be exactly determined by the shape of the corresponding rack tooth, and the profile of a bevel gear wheel by the shape of a tooth of the corresponding crown wheel, i. e. of a bevel gear wheel having an angle of cone of 180°. According to the said suggestion, the rack and the crown wheel, which determine the gearing, are provided with teeth the flanks of which are parts of the surface of a solid cone and parts of the surface of a hollow cone. When both flanks of a space of tooth are to be worked simultaneously into a work piece by means of a tool effecting a rolling motion, the cutting edges of the teeth for making the convex tooth flanks are to have a radius of cone smaller than that of the cutting edges for the concave tooth flanks. When in mesh with each other, two toothed wheels cut in this manner will, accordingly, touch each other's flanks entirely, and not at points, only when the one wheel has been worked by another tool which has equally curved cutting edges and cuts two flanks at a time, viz. by a tool whose teeth are shaped according to the counter-profiles of the first said tool.

According to another suggestion, the two flanks of the teeth of the corresponding rack and the corresponding crown wheel have at least approximately the shape of surfaces of a solid and a hollow sphere, respectively. If the solid and the hollow sphere have the same radii, the counter wheels can be made by the same tool, and flank contact of the teeth of wheels in mesh with each other can take place on the entire tooth breadth. It is, however, often desired in practice to provide a slight difference in the magnitudes of the said radii, so that the condition is fulfilled only approximately, or, in other words, to curve back the cooperating flanks of the teeth over their entire breadth, in order to obtain a wheel gear of the said kind which works sufficiently uniformly and without jerks in spite of the unavoidable small irregularities of the flank surfaces and slight errors in the positions of the toothed-wheel axes. The radius of the solid sphere, according to which the convex flanks are formed, may never be greater but can, according to the accuracy in making the wheels, be at most equal to the radius of the hollow sphere according to which the concave flanks are shaped. In the first said known method, the magnitude of the curving-back depends on the necessarily resulting differences of the radii. It is a special advantage of the wheels with spherical tooth flanks that the said curvature may be of any magnitude.

The known toothed wheels with spherical flanks have the disadvantage that the specially advantageous shape of involute teeth has not been made use of.

The invention refers to bevel gear wheels which have spherical tooth flanks and do not present the said disadvantage, because their teeth correspond to involute teeth of a rack, the profiles of whose tooth flanks are known to be rectilinear. To make use of the known advantages of involute teeth also in a bevel gear wheel whose teeth are so shaped that the tooth flanks of the corresponding crown wheel are at least approximately parts of the surfaces of a solid and a hollow sphere, the invention provides such a shape of tooth for the bevel gear wheel that the spheres which have as a centre the point of intersection of the pitch plane of the crown wheel and the crown wheel axis and whose diameters are at most equal to the exterior and at least equal to the interior diameter of the crown wheel, are intersected by the spherical surfaces of the tooth flanks of the crown wheel approximately in maximum circles. This condition can be adhered to exactly only in the case of one of the said spheres, i. e. in the case of the sphere whose radius, which is determined by the point in which the said sphere intersects both the tooth flank and the pitch plane, includes with the line connecting the centre of the sphere to the centre of the spherical surface of the tooth flank a right angle.

The cutting tool used for making the teeth, which either effects a rolling motion or oscillates about an axis at a finite distance, has teeth whose cutting edges are so curved that the effective cutting edges of the teeth lie on a surface of revolution whose meridional sections are arcs of circles the centres of which lie at least approximately in the axis of rotation of the tool. The said cutting edges, some of which are convex and some of which are concave, are, accordingly, parts of two spherical surfaces. This condition need not, however, be strictly adhered to in practice. It is sufficient if the spherical surfaces are replaced by toric surfaces which touch the spherical surfaces in circles approximately in the middle of the cutting edges, and whose radii of curvature are slightly different from the radii of the spheres. If the said radius of the concave, or interior, cutting edge of the tool is slightly reduced, and if that of the convex, or exterior, cutting edge of the tool is slightly increased with respect to the radius of sphere, the profiles of the tooth flanks of toothed wheels made by means of the said tool are slightly curved back, which may be advantageous as regards uniform run and absence of jerks in gears consisting of such wheels. Moreover, it is thus made possible to curve the profiles of the flanks of the produced wheels at will and independently of the curving of the flanks over the breadth of the teeth, which, as stated above, can be attained by using two different radii of sphere for the concave and convex cutting edges of the tool. In the manufacture of the tool, care is to be taken that the usual backing-off of the cutting teeth permits such a regrinding of the faces of these teeth that the flank profile determined by the cutting edges is maintained.

Figure 2:
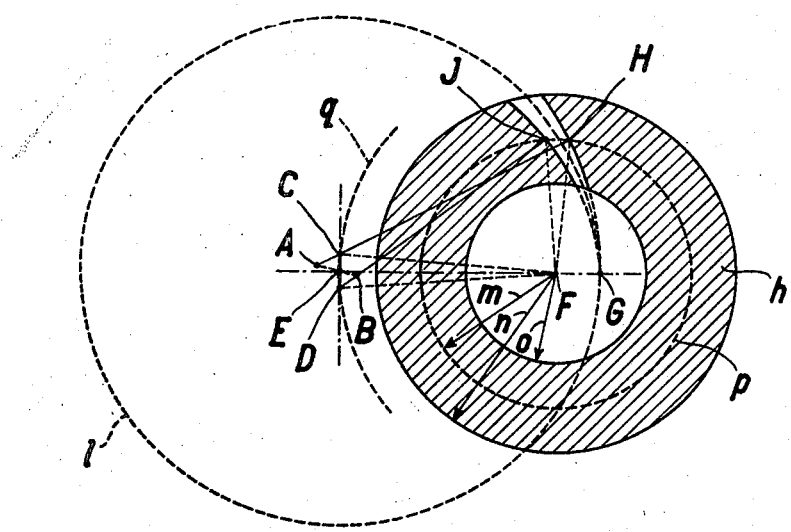
Figure 3:
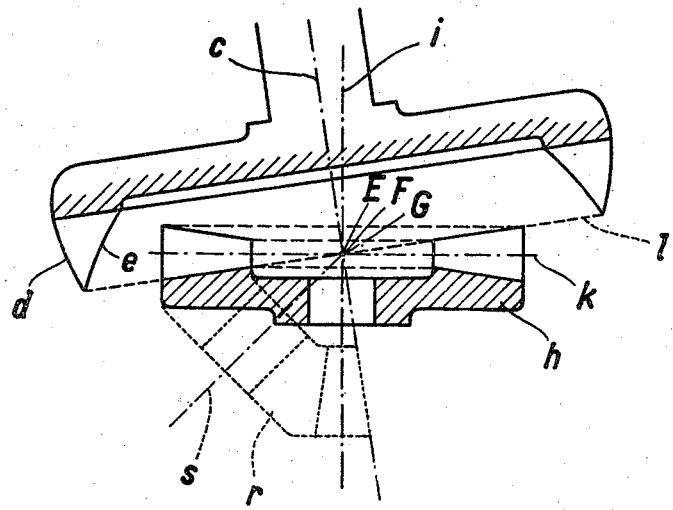

The accompanying drawings illustrate a constructional example of the invention. Figure 1 shows in central section a tool for making the new form of teeth; Figure 2 represents in schematical plan view a crown wheel with a space of tooth cut into it, the crown wheel being cut in the plane of the pitch circle; Figure 3 shows this crown wheel in vertical section and, schematically, the position the work piece assumes in manufacture; and Figure 4 represents a perspective view of the body of the crown-wheel and a space of tooth cut therein.

The tool shown in Figure 1 is a cutter whose circular body $a$ has a plurality of back-off cutting teeth $b$. $c$ is the axis of the cutter. The cutting edges $d$ and $e$ are circular and their radii are $f$ and $g$, respectively. The centres A of the exterior, and therefore convex, cutting edges $d$ and the centres B of the interior, and therefore concave, cutting edges $e$ lie on circles which are described about the tool axis $c$ and have comparatively small diameters. The radius $f$ of the exterior cutting edge $d$ is greater than the radius $g$ of the interior cutting edge $e$. The cutting edges $d$ and $e$ of all teeth $b$ lie, accordingly, on two toric surfaces which approach very nearly two spheres having their centres C and D in the tool axis $c$. The points of the theoretical tooth forms of the tool coincide with the points of intersection of the circles according to which the cutting edges $d$ and $e$ of the tooth $b$ are shaped and lie in a line $l$ of a circle described about a centre E. The said points are practically rounded off, so that the bottoms of the spaces of tooth of the wheels cut by means of the tool are round.

Figure 4:
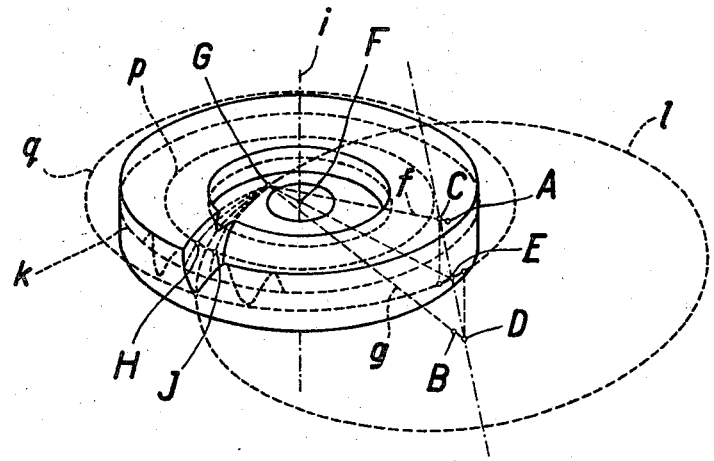

Figures 2 to 4 illustrate how a crown wheel $h$ which determines a set of bevel wheels is made by means of the described tool. To facilitate the understanding of the following considerations, it is assumed provisionally that the radii $f$ and $g$ of the cutting edges $d$ and $e$, respectively, of the tool are equal and that the centres of the spheres corresponding to the cutting edges coincide with the points C and D of the tool axis $c$. $i$ is the axis of the crown wheel $h$, and $k$ is the pitch plane of the gearing. This pitch plane $k$ intersects the axis $i$ at the point F. In the line connecting the point F with a point G lying in the pitch plane $k$ is the point E of the cutter axis $c$, which coincides with a tangent of a sphere that has the centre F and whose radius is equal to the distance of the points of the teeth $b$ from the cutter axis $c$, less the line GF. The circle $l$ the points of the teeth $b$ describe when the cutter rotates about its axis $c$ intersects the pitch plane $k$ at the point G, independently of the inclination of the cutter axis $c$ to the pitch plane $k$.

The magnitude of the inclination of the cutter axis $c$ to the pitch plane $k$ is found as follows. If the point F in the axis $i$ of the crown wheel $h$ is the centre of a sphere whose radius $m$ is smaller than the exterior radius $n$ and greater than the interior radius $o$ of the gearing of the crown wheel $h$, this sphere intersects the pitch plane $k$ in a circle $p$. On the above-mentioned provisional assumption, the flank surfaces the tool cuts into the body of the crown wheel $h$ intersect the sphere which has the radius $m$, and is described about the point F, in such circular lines as contain the points H and J in the pitch plane $k$ and on the circle $p$. These circular lines are parts of maximum circles of the sphere having the radius $m$ and the centre F when the line CF and the line FH as well as the lines DF and FJ contain right angles. If this is the case, the flank profiles corresponding to the points H and J appear as straight lines in the projections on the planes touching in these profiles the sphere round F, whence it follows that on the viewed sphere round F the shape of the tooth cut by the tool into the body of the crown wheel $h$ corresponds to the straight flank profile of a rack with involute teeth. The distance apart of the points H and J depends on what magnitude of pitch the gearing on the circumference of the circle $p$ is given. The cutter axis $c$ is therefore so inclined that the points C and D lie on a cylinder which intersects the pitch plane $k$ in a circle $q$, and that the points C and D lie in radial lines which contain the point F and determine the above-mentioned angles.

The lines in which the flank surfaces intersect spheres round F that have a radius smaller or greater than $m$ are not maximum circles of these spheres, but they do not differ substantially from these greatest circles. The projections on the planes touching the spheres are, accordingly, not rectilinear but slightly curved. Conditions with respect to the extent in which the form of straight flanks is departed are favourable for the crown wheel $h$ over its entire breadth when the magnitude of the radius $m$ is approximately in the middle between the magnitudes of the radii $n$ and $o$.

In consideration of the desired curving-back of the tooth flanks, the construction of the tool shown in Figure 1 has been based on the assumption that the radii $f$ and $g$ of the cutting edges are different. The spaces cut between the teeth of the body of the crown wheel $h$ have, accordingly, flank surfaces forming part not of spheres but of toric surfaces, which differ, however, only slightly from spherical surfaces, so that the above considerations approximate sufficiently the conditions also of crown wheels $h$ to be made by means of the said tool. Whereas it is assumed in Figures 2 to 4 for the sake of simplicity that the teeth $b$ of the cutter end in points, Figure 4 indicates by dash-lines on the exterior circumference of the crown wheel $h$ the toothing produced by a cutter having round ends.

It has been said hereinbefore that the gearing of a crown wheel determines also the toothing of a set of bevel gear wheels. How the tool is positioned with respect to a toothed body when the teeth are cut by a rolling cutter is shown in Figure 3, which represents not only the crown wheel $h$ but, in dash-lines, also a bevel gear wheel $r$ The axis *s* of this bevel gear wheel *r* is inclined to the pitch plane *k* at half the angle of cone of the bevel gear wheel. When the teeth of this bevel gear wheel *r* are being made, the cutter works according to the known rolling method by rotating about its axis *c*, the rolling cone of the bevel gear wheel *r* rolling in a plane which corresponds to the rolling plane of the crown wheel *h*.

Also profile displacement can be readily used in the new gearing with spherical flanks, this profile displacement strengthening the roots of the teeth of the smaller of the two cooperating wheels in gears of comparatively great ratio of gear. The teeth having spherical flanks can be worked in the rolling method by means of grinding wheels of simple construction, which is an advantage of great importance in the case of especially exact gearings.

I claim:

A bevel gear wheel having curved teeth, this bevel gear wheel being a component of a set of bevel gear wheels, a crown wheel being a component of this set, the teeth of the wheels of the said set being determined by the teeth of the said crown wheel, the tooth flanks of a tooth of the said crown wheel being at least approximately parts of the surfaces of a solid and a hollow sphere, the surfaces of these spheres intersecting in a maximum circle a spherical surface whose centre lies at the point of intersection of the pitch plane of the said crown wheel and the axis of this crown wheel, the diameter of the last said spherical surface being smaller than the exterior diameter and greater than the interior diameter of the said crown wheel in the pitch plane.

WALTHER BAUERSFELD.